(12) United States Patent
Harkous et al.

(10) Patent No.: US 11,847,424 B1
(45) Date of Patent: Dec. 19, 2023

(54) NATURAL LANGUAGE GENERATION

(71) Applicant: Amazon Technologies, Inc., Seattle, WA (US)

(72) Inventors: Hamza Harkous, Cambridge (GB); Isabel Groves, Lichfield (GB); Amir Reza Safari Azar Alamdari, Greater London (GB)

(73) Assignee: Amazon Technologies, Inc., Seattle, WA (US)

( * ) Notice: Subject to any disclaimer, the term of this patent is extended or adjusted under 35 U.S.C. 154(b) by 429 days.

(21) Appl. No.: 16/825,872

(22) Filed: Mar. 20, 2020

(51) Int. Cl.
| | |
|---|---|
| *G10L 15/22* | (2006.01) |
| *G06F 40/56* | (2020.01) |
| *G06F 40/51* | (2020.01) |
| *G06N 20/00* | (2019.01) |

(52) U.S. Cl.
CPC .............. *G06F 40/56* (2020.01); *G06F 40/51* (2020.01); *G06N 20/00* (2019.01)

(58) Field of Classification Search
CPC .......... G06F 40/56; G06F 40/51; G06F 40/10; G06F 40/151; G06F 40/166; G06F 40/169; G06F 40/1862; G06F 40/274; G06F 40/279; G06F 40/30; G06F 40/40; G06F 40/55; G06N 20/00; G10L 15/22; G10L 15/00; G10L 15/01; G10L 15/06; G10L 15/063; G10L 15/08; G10L 15/14; G10L 15/16; G10L 15/18; G10L 15/1815; G10L 15/183; G10L 15/26; G10L 15/28; G10L 2015/0631–0638; G10L 2015/221–228

USPC .......................... 704/277, 270, 270.1, 1, 2, 9
See application file for complete search history.

(56) References Cited

U.S. PATENT DOCUMENTS

| | | | |
|---|---|---|---|
| 10,332,508 B1 * | 6/2019 | Hoffmeister | G06N 7/005 |
| 10,489,393 B1 * | 11/2019 | Mittal | G06F 16/2455 |
| 2018/0357508 A1 * | 12/2018 | Cui | G06N 3/08 |
| 2020/0135175 A1 * | 4/2020 | Katz | G10L 15/063 |
| 2020/0356729 A1 * | 11/2020 | Duan | G06N 3/0445 |
| 2021/0358579 A1 * | 11/2021 | Chen | G06N 20/00 |
| 2022/0215184 A1 * | 7/2022 | Freitag | G06F 40/226 |

OTHER PUBLICATIONS

Shen et al.; Pragmatically informative text generation; Proceedings of the 2019 Conference of the North American Chapter of the Association for Computational Linguistics: Human Language Technologies; Apr. 2, 2019; pp. 4060-4067; vol. 1 (Long and Short Papers); Association for Computational Linguistics; Minneapolis, Minnesota.

(Continued)

*Primary Examiner* — Qi Han
(74) *Attorney, Agent, or Firm* — K&L Gates LLP

(57) ABSTRACT

Devices and techniques are generally described for data-to-text generation. In various examples, a first machine learned model may receive first data including a structured representation of linguistic data. In various examples, the first machine learned model may generate first output data comprising a first natural language representation of the first data. In at least some examples, a second machine learning model may determine second data indicating that the first natural language representation is a semantically accurate representation of the first data. In some examples, the first output data may be selected for output based at least in part on the second data.

18 Claims, 10 Drawing Sheets

(56) References Cited

OTHER PUBLICATIONS

Nie et al.; A simple recipe towards reducing hallucination in neural surface realization; Proceedings of the 57th Annual Meeting of the Association for Computational Linguistics; Jul. 28, 2019; pp. 2673-2679; Association for Computational Linguistics; Florence, Italy.

Juraska et al.; Viggo: A video game corpus for data-to-text generation in open-domain conversation; Proceedings of the 12th International Conference on Natural Language Generation. Oct. 26, 2019; 10 pgs.

Kedzie et al.; A good sample is hard to find: Noise injection sampling and self-training for neural language generation models; Proceedings of the 12th International Conference on Natural Language Generation; Nov. 8, 2019; pp. 584-593; Association for Computational Linguistics; Tokyo, Japan.

Dusek et al.; Semantic Noise Matters for Neural Natural Language Generation; Proceedings of the 12th International Conference on Natural Language Generation; Nov. 10, 2019; 8 pgs.

\* cited by examiner

NATURAL LANGUAGE GENERATION

BACKGROUND

Automatic speech recognition (ASR) combined with language processing techniques may enable a computing device to retrieve and process commands from a user based on the user's spoken commands. Natural language processing can be used to translate the spoken requests into semantic interpretations of the spoken command. Executable instructions are generated based on the semantic interpretation of the spoken command. The executable instructions are executed and a corresponding task is performed. Such speech processing and voice control may be used by personal computers, hand-held devices, telephone computer systems, and a wide variety of other computing devices to improve human-computer interactions and to control various systems.

DETAILED DESCRIPTION

Figure 1:
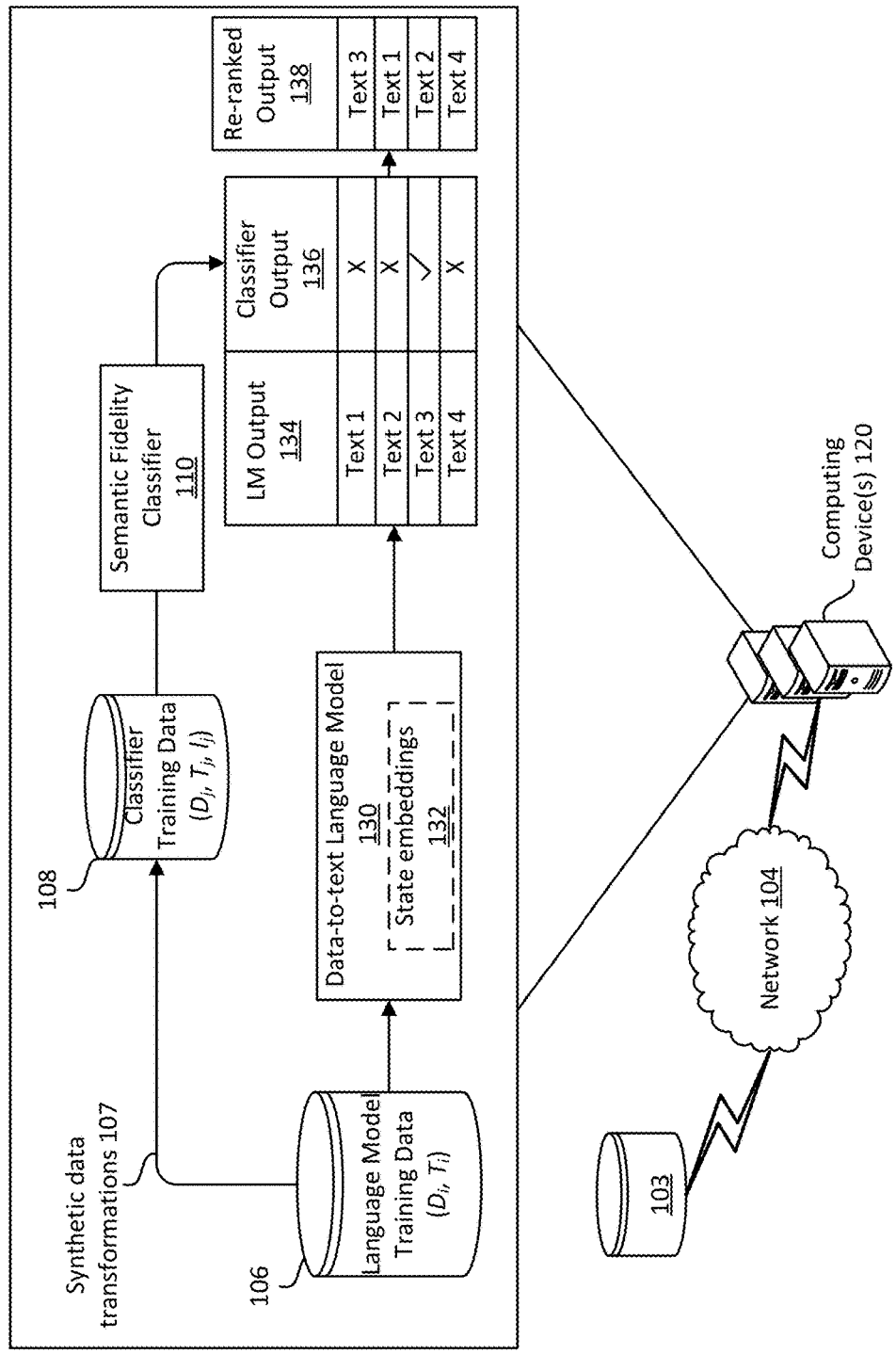
FIG. 1 is a diagram of a system configured to generate text from data, according to various embodiments of the present disclosure.

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Data-to-text generation refers to the task of automatically generating text from non-linguistic inputs. Non-linguistic inputs may take a variety of forms, such as structured data records, databases, spreadsheets, etc. Data-to-text generation has been used to generate weather reports, restaurant descriptions, and video game dialogues, among other applications. Data-to-text generation systems often follow a pipeline-based approach, in which the problem of generating text from non-linguistic data is separated into a number of sub-problems. Such sub-problems often include content selection (e.g., determining what information from the data to include in the text), text structuring (e.g., determining the order in which to present the information in the text), sentence aggregation (e.g., determining what information goes in individual sentences), etc. Pipeline-based approaches often use machine learned models that are trained using datasets specific to the particular sub-problem for which the machine learned model has been trained.

A pipeline-based data-to-text generation technique is a data-to-text methodology that breaks the data-to-text problem down into a number of sub-tasks that are each performed independently. Various non-pipeline-based approaches (e.g., so called "end-to-end" methods) use machine learning models (e.g., deep learning networks) that receive structured data as input and output text. Such methods can be trained with (data, text) tuples (sometimes referred to herein as "data-text tuples"). In contrast, in pipeline-based approaches, each machine learning sub-task uses its own configuration and training data. For example, training data for pipeline-based approaches may require training data with semantic alignments between sections of the training text and/or portions of the meaning representation (e.g., the data being transformed into text). Individual configuration and/or training of individual components of pipeline-based data-to-text approaches renders the pipeline-based approach complex to develop and prone to error propagation between components. As known to those skilled in the art, meaning representations are structured representations of semantic meaning of linguistic input. For example, a triple is a meaning representation that represents the relationship (e.g., the predicate of the triple) between a subject (defined by the triple) and the object (defined by the triple).

End-to-end data-to-text methods typically are faced with two primary challenges: (1) generalization of the end-to-end systems to unseen domains (e.g., domains different from the training data), and (2) maintaining semantic fidelity to accurately convey the source data in the text. In various embodiments described herein, end-to-end, domain-independent data-to-text systems are described. In various examples, the machine learning data-to-text systems described herein do not make assumptions about the generated text and/or the meaning representation used to generate the text. In various embodiments, the data-to-text systems use a pre-trained language model with fine-grained state embeddings of the input data representations to achieve generalization across domains, as described in further detail below. Additionally, in various embodiments, the data-to-text systems described herein employ a weakly-supervised semantic fidelity classifier (SFC) machine learning model to detect and avoid text-generation errors (such as hallucination, omission, repetition, and value errors). These errors are discussed in further detail below. The semantic fidelity classifier may be used to assess the outputs of any data-to-text system to detect semantic errors in the generated text.

In various examples, the data-to-text systems described herein may offer significantly increased performance relative to current pipeline-based and end-to-end systems. For example, the various systems described herein have scored from 1.2 to 5.9 points higher on the bilingual evaluation understudy score (BLEU), compared to the best existing pipeline-based and E-to-E techniques. Additionally, the systems described herein generate text with significantly increased fluency relative to previous approaches, as judged by crowdsourcing experiments. Finally, the data-to-text systems described herein offer improved accuracy (4.2% to 14.2% more accurate) relative to current heuristic-based approaches, as assessed by manual annotation.

Machine learning techniques are often used to form predictions, solve problems, predict text, etc. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model may be referred to as back propagation.

Deep learning networks often require large amounts of training data in order to achieve acceptable performance during prediction. In some examples, different machine learning models are deployed for prediction in a variety of different domains.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system.

In certain situations, a user utterance may include a question to be answered by a speech processing system. That is, the user may ask the system to provide some information in response to the user's utterance. As part of NLU processing, in order to respond to a user's query, the system may use a knowledge base to obtain or confirm information requested by the query. A knowledge base is a data store that includes facts organized in a particular manner that may be used to respond to user queries. A knowledge base may include a collection of tuples and may encode formal semantics on the data stored within the knowledge base. The knowledge base may also include a schema (e.g., defined by classes and properties) to organize its data. In order to retrieve answer data from a knowledge base, a query may first be parsed and new data generated in a form recognizable by the knowledge base.

There are many types of queries that a user may pose from simple single-fact questions (for example, "what is the capital of France?") to more detailed questions involving time, place, multiple entities, etc. (for example, "when was Tom Cruise married to Nicole Kidman?"). Query resolution systems may rely on a rule/template based approach. In such an approach, a series of rules may be used to analyze the incoming query text to identify the intent of the query (e.g., what information is being sought) and what entities are named in the query that are needed to provide the desired information. In a rule/template based approach, rules may be applied to query text, where the results of each rule's processing may be given a confidence score where the rule results corresponding to a highest confidence score are selected, parsed and passed on to the knowledge base.

Result data may be generated in a structured data representation using the knowledge base (such as a knowledge graph). For example, for the query, "how old is Barack Obama?" a knowledge graph may be used to generate structured result data comprising the triple [barack_obama] [has_age] [age: [integer:["58"]]]. A triple is an example of structured data including a meaning representation of the result. Generally, structured data may specify one or more entities and/or relationships between those entities. In a triple, a first entity, referred to as a "subject," is linked to a second entity, referred to as an "object," by a "predicate." In the foregoing example, Barack Obama is the subject, has_age is the predicate, and 58 is the object. In another example, a query may be "what is the capital of France?" A question and answer system (using various NLU techniques) may select one or more triples from a knowledge graph as an appropriate response to the query. For example, the triple [Paris] [is_capital_of] [France] may be selected. Described herein, are data-to-text generation systems effective to receive such structured representations of data (e.g., triples, etc.) and to generate text data that semantically represents the input structured data using natural language.

Structured data may comprise triples and/or other abstract meaning representations (AMRs). In various examples, data-to-text generation techniques described herein may be used to receive such structured data (e.g., one or more triples or other AMRs) as input and may generate text data that semantically represents such structured data for output via a text to speech (TTS) component of a speech processing system. Text-to-speech (TTS) is a field of computer science, artificial intelligence, and linguistics concerned with enabling computers to output synthesized speech. ASR, NLU, and TTS may be used together as part of a speech processing system.

FIG. 1 is a diagram of a system 100 configured to generate text from data, according to various embodiments of the present disclosure. As depicted in FIG. 1, computing device(s) 120 may include one or more computer-readable memories 103 and/or may be configured in communication with computer-readable memories 103, such as over network 104. In various examples, network 104 may represent a local area network (LAN) and/or a wide area network (WAN) such as the internet. In various examples, the one or more computer-readable memories 103 may store non-transitory computer-readable instructions that, when executed by one or more processors of the computing device(s) 120, may be effective to program the one or more processors to perform the various data-to-text generation techniques described herein.

The system 100 may include a data-to-text language model 130. In various examples, the data-to-text language model 130 may be a multi-layer autoregressive language model, such as the OpenAI GPT-2 model (Radford et al., 2019). More generally, the data-to-text language model 130 may be any neural language model (e.g., a transformer decoder language model, such as a causal transformer decoder) configured to receive a structured data input and output text data that semantically represents the structured data. Structured data may include any data that is represented in a structured way, such as in a database, table, array, and/or other data structure. As known to those of skill in the art, each layer of a language model may comprise a decoder block (e.g., a transformer decoder block) of masked multi-headed attention, and a fully-connected feed-forward neural network layer. In various embodiments described herein, a linear layer is added to the output of the transformer decoder language model to adjust the output of the data-to-text language model 130 for classification by the semantic fidelity classifier 110. The language model of the data-to-text language model 130 may be pre-trained using a large corpus of training data (e.g., a training dataset comprising millions or even billions of training instances) prior to fine tuning the data-to-text language model 130 for data-to-text generation as described in further detail below. A pre-trained language model may be effective to generate predictions for subsequent words given a sequence of one or more input words. The pre-trained language model may generate confidence scores in association with each predicted word. Accordingly, the pre-trained language model may be already trained to generate valid sentences in the selected language. In the examples described below, such a pre-trained language model is updated (e.g., updated parameters are determined) for the data-to-text task such that the language model is tuned for the data-to-text generation task. In other words, the pre-trained language model is updated in order to be able to generate semantic text representations of input structured data (e.g., triples).

Parameters of the data-to-text language model 130 may be updated using a dataset comprising data, text tuples $(D_i, T_i)$. The data, text tuples may be stored in a training data repository 106. As described in further detail below in reference to FIG. 2, inputs to the data-to-text language model 130 during training may include tokens representing words (and/or sub-words), positional encodings to capture the input tokens' order within sentences, and state embeddings 132. As described in further detail below, the state embeddings 132 define different "node types" that describe categories of the structured data input (e.g., subject, predicate, and object, in the case of triples), and allow the data-to-text language model 130 to learn the type of structural data being processed in order to generate output text data that semantically represents the structured data.

After training, the data-to-text language model 130 generates a number of text outputs (language model output 134 ("LM Output 134" in FIG. 1)) for a given data input. In an example embodiment, a beam search technique is used wherein a product of the conditional probabilities of each word in the text is multiplied with a length normalization factor to obtain an output confidence score for each instance of output text. In various examples, text hypotheses of the language model output 134 that are below a threshold output confidence score may be dropped. The semantic fidelity classifier 110 may be used to generate a re-ranked output 138 of the language model output 134, as described in further detail below. The semantic fidelity classifier 110 may generate a label for each text hypothesis of the language model output 134. If the label associated with a particular text hypothesis indicates that the semantic fidelity classifier has determined that the text conveys a semantically accurate representation of the input structured data (indicated using a check mark in FIG. 1), the text hypothesis may be re-ranked as the top-ranked result in the re-ranked output 138. If multiple text hypotheses include the "accurate" label, the language model output confidence scores may be used to resolve the tie (with text hypotheses being ranked in descending order of output confidence scores).

As described in further detail below, the semantic fidelity classifier 110 may be trained using modified versions of the same training data that is used to fine tune the data-to-text language model 130 (e.g., the data, text tuples $(D_i, T_i)$ stored in training data repository 106). As described in further detail below, the system may perform synthetic data transformations 107 on instances of the training data tuples $(D_i, T_i)$ in order to generate classifier training data 108. The classifier training data 108 may associate a label $l_j$ with each of the tuples $(D_i, T_i)$ resulting in the classifier training instances $(D_j, T_j, l_j)$. The labels l may indicate 1) whether the text T is a semantically accurate representation of the structured data D; 2) whether the text T includes an omission (e.g., of a sentence) such that the text T omits text representing some portion of the structured data D; 3) whether the text T includes a "hallucination" (e.g., a semantically-irrelevant random sentence from a different training instance); and/or 4) whether the text T includes a value error from the structured data D. Value errors may be synthetically generated by selecting a random value x occurring in the data $D_i$ and the text $T_i$ and replacing the value x in $T_i$ with a random other value from $D_i$. FIG. 4B describes the synthetic data transformation 107 operation in further detail.

The semantic fidelity classifier 110 may be a pre-trained encoder (e.g., RoBERTa (Liu et al., 2019)) that predicts a label for a given data, text pair. The semantic fidelity classifier 110 is thus updated using classifier training data 108 to determine a label l for each input tuple $(D_i, T_i)$, where the input tuple $(D_i, T_i)$ includes the data D input to the data-to-text language model 130 and the output text T of the language model output 134. Accordingly, for each language model output 134, classifier output 136 is generated indicating whether the semantic fidelity classifier 110 has determined that the output text is accurate, includes an omission, includes a hallucination, and/or includes a value error. It should be appreciated that more or fewer labels may be used, and that different labels apart from those specifically enumerated herein may be used in accordance with the present disclosure. As previously described, the scores of the language model outputs 134 and the classifier output 136 may be used to re-rank the language model outputs 134 to generate re-ranked output 138. Using a pre-trained data-to-text language model 130 that is fine-tuned using state embeddings 132, along with semantic fidelity classifier 110 for determining semantic fidelity of the text output by the data-to-text language model 130 may generate improved data-to-text output.

A decoding algorithm of the data-to-text language model 130 is described below. However, it should be appreciated that different decoding algorithms may be used to generate the text hypotheses (e.g., language model output 134) and the output confidence scores associated with each of the text hypotheses. The decoding algorithm described below is based on beam search techniques known to those of skill in the art.

At each decoding step, text hypotheses of the language model output 134 are ranked according to the output confidence score R, given below, which may be determined by multiplying the conditional probabilities' product with a length normalization factor. Low-scoring candidates (e.g., below a threshold output confidence score) may be dropped once the number of candidates exceeds the beam size.

$$R = \frac{1}{(i - (|D| + 2))^a} \prod_{|D|+2}^{i} P(s_i \mid s_0 \ldots s_{i-1})$$

In various examples, in contrast to traditional beam search, the output confidence scores may not be aggregated from the start of the sequence, but may instead be aggregated from the start of the text component (e.g., index |D|+2). Moreover, the length normalization may be adjusted to only account for the text component (and not the data component). This technique may be used as the data-to-text language model 130 may be fine-tuned on generating text given data as a context, and not on generating the data itself, as described herein. Hence, the data tokens may be removed from the beam-scoring function to prevent the decoder from favoring longer sequences. In various examples, the value of a may be a hyperparameter (e.g., 0.75, 0.8, etc.). At the end of the beam-search, the semantic fidelity classifier 110 may be used to re-rank the text hypotheses (terminated with an end-of-sequence token) in the beam. The following binary score may be used to re-rank the text hypotheses:

$$SFC(D_i, T_i) = \text{``accurate''}$$

where "SFC" represents the semantic fidelity classifier 110. Hence, the text $T_i$ is appended to the top of the re-ranked list if the semantic fidelity classifier 110 labels the $(D_i, T_i, L)$ tuple as "accurate" (represented as a check mark in FIG. 1). As previously described, ties among accurate text hypotheses may be resolved using the original data-to-text language model 130 output confidence scores. In various other embodiments, re-ranking may be applied at each decoding stage. In addition to helping to generate semantically accurate outputs, the classifier output 136 (e.g., the labels generated by the semantic fidelity classifier 110) may be used to assess whether the generated text is usable in practice. In various examples, the end-to-end model-based approach described herein may outperform current heuristic-based approaches that are commonly used for the data-to-text generation task.

Figure 2:
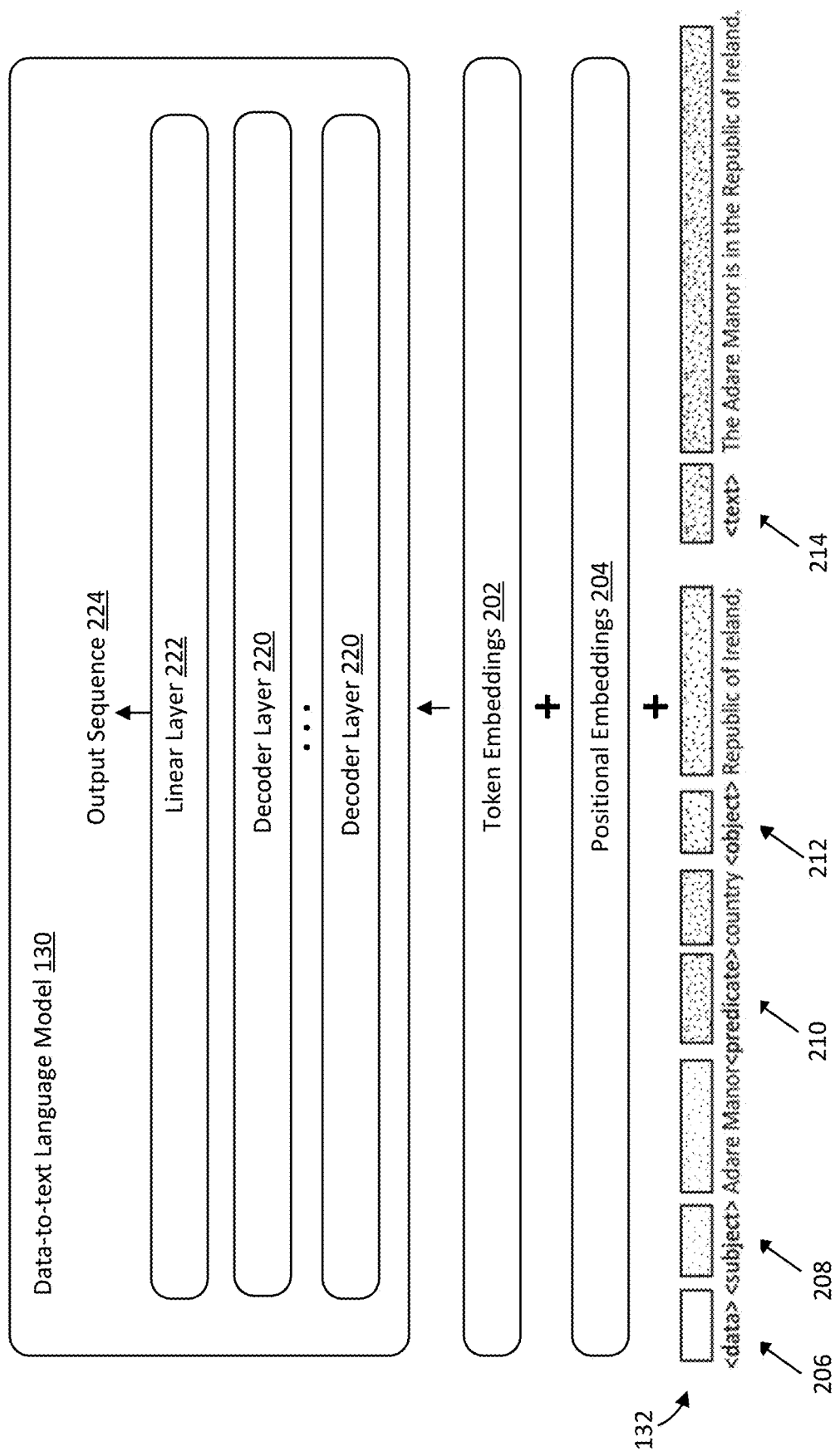
FIG. 2 depicts inputs to a data-to-text language model, including input state data, in accordance with various embodiments of the present disclosure.

FIG. 2 depicts inputs to data-to-text language model 130, including input state embeddings 132, in accordance with various embodiments of the present disclosure.

Learned input to the data-to-text language model 130 may include token embeddings 202, embeddings 204, and state embeddings 132. The token embeddings 202, positional embeddings 204, and state embeddings 132 may be learned during tuning of the pre-trained data-to-text language model 130 using the data, text tuples $(D_i, T_i)$ stored in training data repository 106 (FIG. 1). Token embeddings 202 comprise representations of input tokens (e.g., words and/or parts of words). The sequence of tokens in input data and/or text is mapped to an index in a data structure comprising the vocabulary of the data-to-text language model 130. The sequence of input tokens may be concatenated into an embedding vector. Positional embeddings 204 (e.g., positional data) comprise data representing an order of the input tokens in the data and/or the text.

The data D and the text T may be concatenated into a single sequence (<data>{D}<text>{T}) for input to the data-to-text language model 130. These tokens may be appended to the original vocabulary of the data-to-text language model 130. After tokenization, a sequence of subword tokens is generated, which are encoded to point to vocabulary indices:

$$S = (\text{<data>}, d_1, \ldots d_k, \text{<text>}, t_1, \ldots t_m)$$

$$= s_0, \ldots sn)$$

The data-to-text language model 130 may additionally determine positional embeddings 204 as input to represent the order of the token embeddings 202.

The data-to-text language model 130 may additionally determine state embeddings 132. The state embeddings 132 may be used to give the data-to-text language model 130 a "hint" on the type of the data being handled. The state vector for S is a vector of tokens with size |S|, with each token ID indicating the node type of $s_i$ (described in further detail below). For all datasets: the state token ID of any token $s_i$ may be the ID of the last special token (e.g., node type) preceding it (e.g., in the range $(s_0 \ldots s_i)$, inclusively). One interesting feature of the pre-trained GPT-2 language model is the use of Byte-Pair Encoding (BPE) (Sennrich et al., 2016) on bytes instead of unicode characters. Hence, with a modestly-sized subword vocabulary of around 50K, the GPT-2 language model may encode any input text and score any output sequence, without suffering from unknown tokens. This may be beneficial for tasks where named entities are common. In various examples, the data-to-text language model 130 may omit various text from the output text using the state embeddings 132. For example, the data-to-text language model 130 may determine, during training, that in some circumstances the predicate may be omitted from the text output. For example, as depicted in FIG. 2, although the text "country" is associated with the node type <predicate> 210, the output text omits the term "country." In some examples, the data-to-text language model may omit the predicate data (or other data) based at least in part on the state embeddings 132.

State embeddings 132 may comprise special tokens referred to herein as "node types." The node types may be metadata describing a category of the structured data. For example, if the structured data includes one or more triples, the state embeddings 132 may include node types <subject> (208), <predicate> (210), and <object> 212 that define different categories of the input triples. For example, first metadata 208 may identify the portion of the data $D_i$ that is the subject of the triple. Second metadata 210 may identify the portion of the data $D_i$ that is the predicate of the triple, and so on. In addition, the node types <data> (206) and <text> (214) define whether data associated with node type is data $D_i$ or text T The embeddings of such node types may be learned during tuning of the data-to-text language model 130. Each of the node types may be associated with the value data following the node type. For example, the node type <subject> (208) may be associated with the value data "Adare Manor" (e.g., a vector representation of the string data Adare Manor and/or an index to a node in a knowledge graph). In the example, the node type <subject> (208) may indicate that the value data "Adare Manor" associated with the node type <subject> (208) is the subject of the triple. Similarly, the node type <predicate> (210) may be associated with the value data "country." Accordingly, "country"

may be the predicate of the triple, as indicated by "country" being the value data associated with the node type <predicate> (210). In various examples, the node types may identify a subject, a predicate, and/or an object corresponding to categories of the structured input data $D_i$.

In various examples, the data-to-text language model 130 may comprise any number of decoder layers 220. Decoder layers 220 may be configured to receive the combined token embeddings 202, positional embeddings 204, and state embeddings 132, and may generate predicted output sequence 224 (comprising predicted output text). In various examples, each decoder layer 220 of the data-to-text language model 130 may comprise a transformer decoder block of masked multi-headed attention and a fully connected layer (as known to those skilled in the art).

During training, the input token embeddings 202, positional embeddings 204, and state embeddings 132 are concatenated together and fed to the first decoder layer 220 (e.g., a first layer of GPT-2). In various examples, the last decoder layer 220 output may be normalized using "Layer-Norm" (Ba et al., 2016) before passing it to a linear layer 222. The weights of the linear layer 222 may be learned using the input embeddings. In various examples, a Softmax layer (not shown in FIG. 2) may be applied to the output of the linear layer to generate probability distributions of the output tokens (e.g., output sequence 224). The training objective may be a language-modeling objective where the aim is to find the set of weights θ that minimizes the following cross-entropy loss:

$$\ell = \sum_{i=|D|+2}^{|S|} \log P_\theta(s_i | s_0, \ldots s_{i-1}) \quad (1)$$

Note that, since the task is to generate text T given the data D, the data component may be masked in the loss above. Accordingly, the loss may be summed from index |D|+2 (e.g., after the <text> token).

A decoding algorithm of the data-to-text language model 130 is described below. However, it should be appreciated that different decoding algorithms may be used to generate the text hypotheses (e.g., language model output 134 in FIG. 1) and the output confidence scores associated with each of the text hypotheses. The decoding algorithm described below is based on beam search techniques known to those of skill in the art.

At each decoding step, text hypotheses of the language model output 134 are ranked according to the output confidence score R, give below, which may be determined by multiplying the conditional probabilities' product with a length normalization factor. Low-scoring candidates (e.g., below a threshold output confidence score) may be dropped once the number of candidates exceeds the beam size.

$$R = \frac{1}{(i-(|D|+2))^\alpha} \prod_{|D|+2}^{i} P(s_i | s_0 \ldots s_{i-1}) \quad (2)$$

In various examples, in contrast to traditional beam search, the output confidence scores may not be aggregated from the start of the sequence, but may instead be aggregated from the start of the text component (e.g., index |D|+2). Moreover, the length normalization may be adjusted to only account for the text component (and not the data component). The data-to-text language model 130 may be fine-tuned for generating text given data as a context, instead of for generating the data itself. Hence, the data tokens may be removed from the beam-scoring function to prevent the decoder from favoring longer sequences. In various examples, the value of α may be a hyperparameter (e.g., 0.75, 0.8, etc.). At the end of the beam-search, the semantic fidelity classifier 110 (FIG. 1) may be used to re-rank the text hypotheses (terminated with an end-of-sequence token) in the beam. The following binary score may be used to re-rank the text hypotheses:

$$SFC(D_i, T_i) = \text{"accurate"}$$

where "SFC" represents the semantic fidelity classifier 110. Hence, the text $T_i$ is appended to the top of the re-ranked list if the semantic fidelity classifier 110 labels the $(D_i, T_i)$ tuple as "accurate" (represented as a check mark in FIG. 1). As previously described, ties among accurate text hypotheses may be resolved using the original data-to-text language model 130 output confidence scores. In various other embodiments, re-ranking may be applied at each decoding stage. In addition to helping to generate semantically accurate outputs (e.g., accurate semantic representations of the input data), the classifier output 136 (e.g., the labels generated by the semantic fidelity classifier 110) may be used to assess whether the generated text is usable in practice. In various examples, the end-to-end model-based approach described herein may outperform current heuristic-based approaches that are commonly used for the data-to-text generation task.

Figure 3:
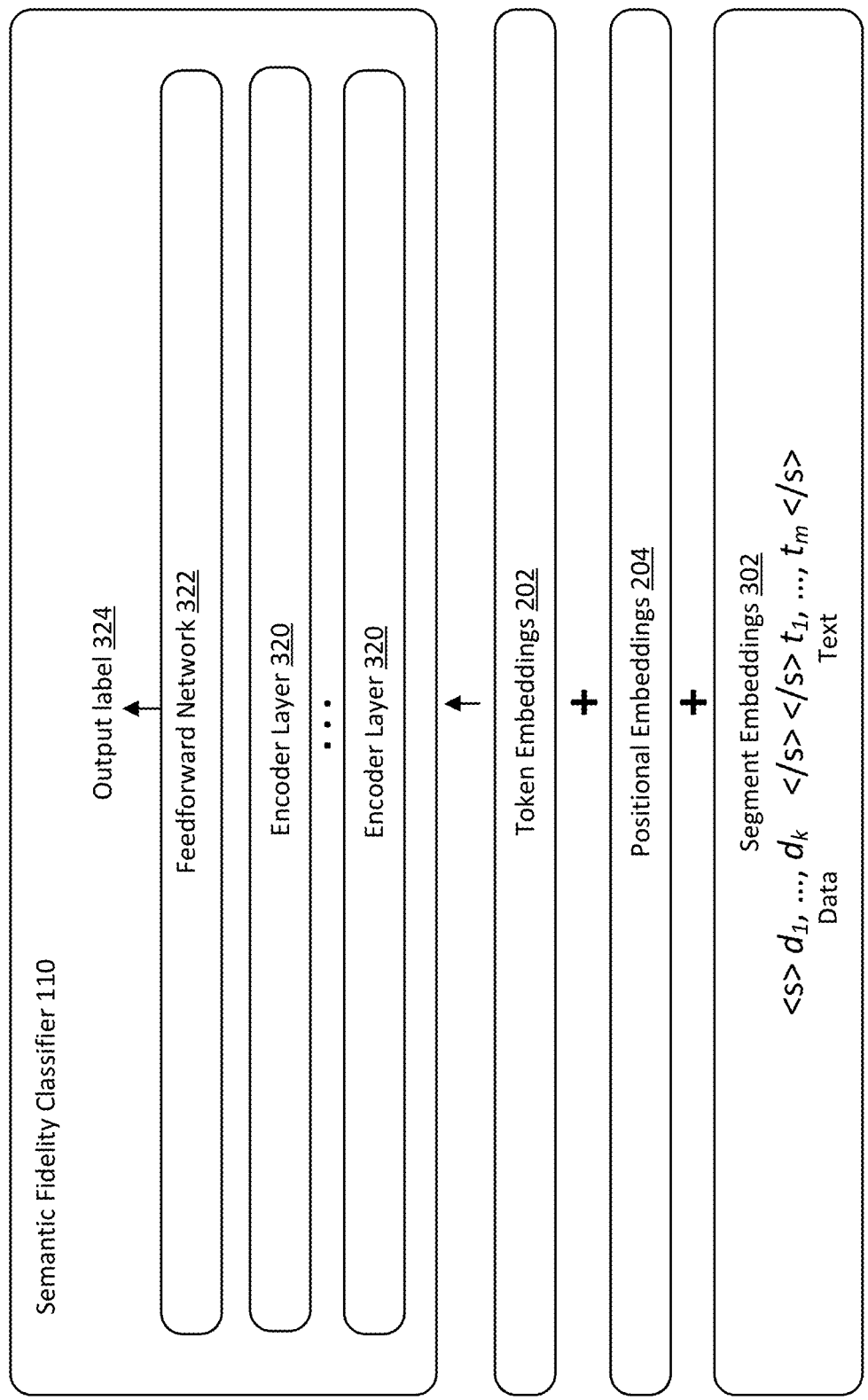
FIG. 3 depicts a semantic fidelity classifier used to classify text output by a data-to-text language model, in accordance with various aspects of the present disclosure.

FIG. 3 depicts a semantic fidelity classifier 110 used to classify text output by a data-to-text language model, in accordance with various aspects of the present disclosure.

Generally, the semantic fidelity classifier 110 may be trained to predict whether or not text is semantically accurate for given input data.

A text is deemed to possess semantic fidelity if it accurately conveys all parts of the input data without omitting any nor adding additional data. The semantic fidelity classifier 110 provides an additional assessment of how accurately the text generated by data-to-text language model 130 reflects the input data. In semantic fidelity classification, the goal is to determine if the text is "accurate," or conversely, if the text includes some "omission," "repetition," "hallucination," and/or "value error." The semantic fidelity classifier 110 uses a pre-trained encoder (e.g., pretrained models such as BERT (Devlin et al., 2019) and RoBERTa (Liu et al., 2019) used in the Natural Language Inference (NLI) task, where the goal is to determine whether a "hypothesis" is true, false, or undetermined given a "premise"). The pre-trained encoder of the semantic fidelity classifier 110 is used to generate a label indicating whether the text generated by the data-to-text language model 130 for the (Data, Text) pair is accurate or includes one or more errors.

As shown in FIG. 3, the data and text tokens are concatenated into segment embeddings 302, adding the special start (<s>) and end (</s>) tokens used during the training of the semantic fidelity classifier 110. Sub-word and word token embeddings 202 and positional embeddings 204 (representing the position in the input), are input to the semantic fidelity classifier 110, along with the segment embeddings 302 during prediction. The segment embeddings 302 represent the data type vs. the text type.

Classifier training data 108 (FIG. 1) is used to train the semantic fidelity classifier 110. As previously described, the classifier training data 108 may associate a label $l_j$ with each of the tuples $(D_i, T_i)$ resulting in the classifier training instances $(D_j, T_j, l_j)$. The labels l may indicate 1) whether the text T is a semantically accurate representation of the structured data D; 2) whether the text T includes an omission (e.g., of a sentence) such that the text T omits text representing some portion of the structured data D; 3) whether the text T includes a "hallucination" (e.g., a semantically-irrelevant random sentence from a different training instance); and/or 4) whether the text T includes a value error from the structured data D. Value errors may be synthetically generated by selecting a random value x occurring in the data $D_i$ and the text $T_i$ and replacing the value x in $T_i$ with a random other value from $D_i$.

Figure 4A:
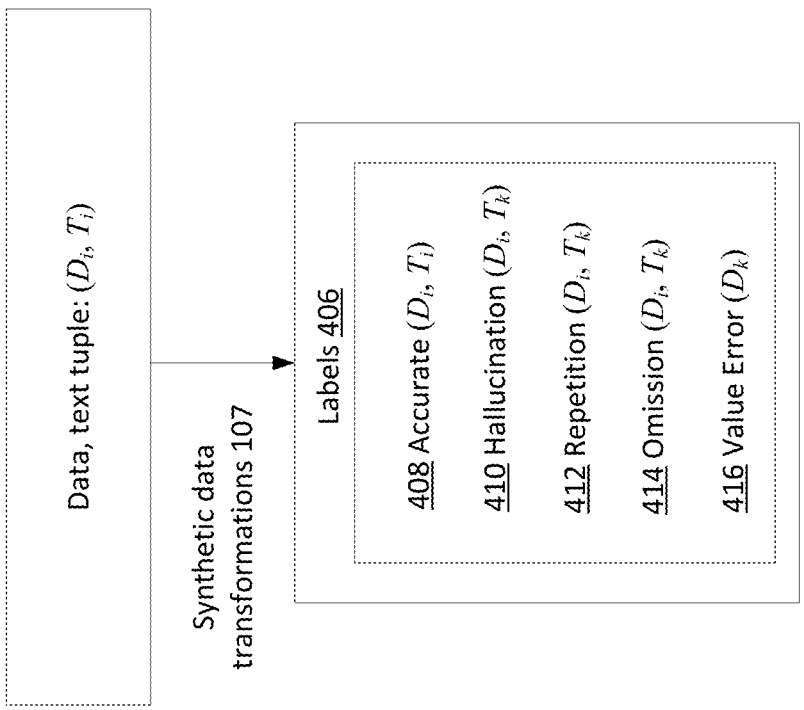
FIG. 4A depicts synthetic training data that may be used to train a semantic fidelity classifier machine learning model, in accordance with various aspects of the present disclosure.
Figure 4B:
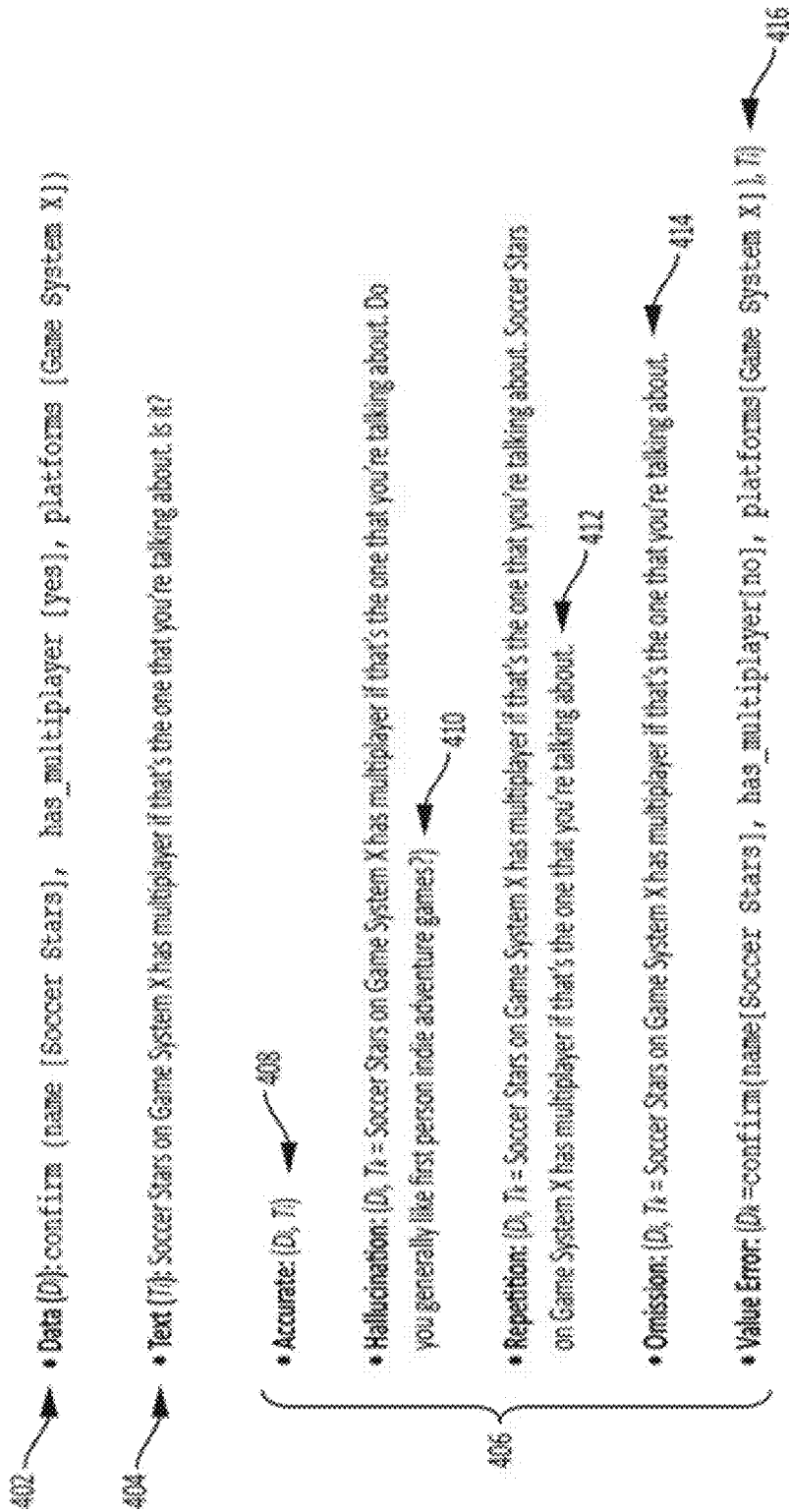
FIG. 4B depicts examples of synthetic training data that may be used to train a semantic fidelity classifier machine learning model, in accordance with various aspects of the present disclosure.

FIG. 4A depicts synthetic training data that may be used to train a semantic fidelity classifier machine learning model, in accordance with various aspects of the present disclosure. Data $D_i$ and text $T_i$ may be paired as a Data, Text tuple ($D_i$, $T_i$). In some examples, synthetic data transformations 107 may be performed on the data $D_i$ and/or text $T_i$ to generate training data for training the semantic fidelity classifier 110. If the text is a semantically accurate representation of the data $D_i$, the label "accurate" 408 may be associated with the data text tuple ($D_i$, $T_i$).

In some examples, the synthetic data transformation 107 may insert a random sentence into the text that does not semantically represent the data $D_i$. In such example synthetic data transformations, the resulting data, text tuple ($D_i$, $T_k$) may be associated with the label "Hallucination" 410.

In some examples, the synthetic data transformation 107 may insert a random sentence into the text that does not semantically represent the data $D_i$. In such example synthetic data transformations, the resulting data, text tuple ($D_i$, $T_k$) may be associated with the label "Hallucination" 410.

The label 412 ("Repetition") may indicate that the text $T_k$ is an inaccurate representation of the data $D_i$, as the text may include a repeated sentence. A repetition may be generated by copying a random sentence in the text $T_i$ and re-inserting the copy at any position in the text as a duplicate to generate text $T_k$.

The label 414 ("Omission") may indicate that the text $T_k$ is inaccurate, as the text may omit some portion of the data $D_i$. An omission may be generated by removing the shortest sentence in the text $T_i$ or by removing a random sentence in the text $T_i$.

The label 416 ("Value Error") may indicate that there are one or more value errors in the data $D_i$ resulting in erroneous data $D_k$. A value error may be generated by selecting a random value x that occurs verbatim in both D and $T_i$ and replacing it with a random other value from D to generate $D_k$.

FIG. 4B depicts examples of synthetic training data that may be used to train a semantic fidelity classifier machine learning model, in accordance with various aspects of the present disclosure. It should be appreciated that the examples depicted in FIG. 4B are merely illustrative examples of data D and text $T_i$, and that the D and text $T_i$ can take many other forms apart from what is specifically shown in FIG. 4B. Data 402 and text 404 may be paired as a Data, Text tuple ($D_i$, $T_i$). The text 404 may be a semantically accurate representation of the data 402. Labels 406 represent labels I that may be associated with the Data, Text tuple ($D_i$, $T_i$) during synthetic generation of classifier training data 108. The label 408 ("Accurate") may indicate that the text is a semantically accurate representation of the data. Accordingly, no operation need be performed on the input tuple ($D_i$, $T_i$) to generate the label 408 since text 404 is a semantically-accurate representation of data 402.

As previously described, the label 410 ("Hallucination") may indicate that the text is an inaccurate semantic representation of the data 402, as some random sentence has been inserted into the text that does not semantically represent the data 402. A hallucination may be generated by selecting a random sentence from another data, text tuple ($D_j$, $T_j$) into the text 404 at a random position. Accordingly, in the example depicted, the sentence "Do you generally like first person indie adventure games?" has been inserted in the text 404. This text may be semantically inaccurate with respect to the input data 402. For example, the game "Soccer Stars" may be a sports game and not an indie adventure game.

As previously described, the label 412 ("Repetition") may indicate that the text is inaccurate, as the text may include a repeated sentence. A repetition may be generated by copying a random sentence in the text 404 and re-inserting the copy at any position in the text 404 as a duplicate. In the example depicted in FIG. 4B, the sentence "Soccer Stars on Game System X has multiplayer if that's the one that you're talking about" appears twice and is thus a repetition.

As previously described, the label 414 ("Omission") may indicate that the text is inaccurate, as the text may omit some of the data 402. An omission may be generated by removing the shortest sentence in the text 404. In the example depicted in FIG. 4B, the sentence "Is it?" from text 404 is omitted in the synthetic text $T_k$, constituting an omission labeled with label 414. In some other examples, omissions may be generated by removing tokens from the data 402 instead of removing an entire sentence.

As previously described, the label 416 ("Value Error") may indicate that there are one or more value errors in the data $D_k$. A value error may be generated by selecting a random value x that occurs verbatim in both $D_i$ and $T_i$ and replacing it with a random other value from $D_j$. In the example depicted in FIG. 4B, the value has_multiplayer [yes] in data 402 has been replaced with has_multiplayer [no] in the data $D_k$ labeled with label 416.

The semantic fidelity classifier 110 may be trained using the classifier training data 108 that may be synthetically generated using the language model training data tuples ($D_i$, $T_i$) used to tune the data-to-text language model 130, as described above in reference to FIG. 4B.

Returning to FIG. 3, during training, the token embeddings 202, positional embeddings 204, and segment embeddings 302 may be summed element-wise to produce the input representation passed to the first encoder layer 320. Each encoder layer 320 may comprise a self-attention layer followed by a feed-forward network 322. The model may be trained as a multi-class classifier (5 labels l, described above), with a cross-entropy loss as the objective. During prediction, the semantic fidelity classifier 110 may generate a label for each text hypothesis of the language model output 134 (FIG. 1). If the label associated with a particular text hypothesis indicates that the semantic fidelity classifier has determined that the text conveys a semantically accurate representation of the input structured data (indicated using a check mark in FIG. 1), the text hypothesis may be re-ranked as the top-ranked result in the re-ranked output 138. If multiple text hypotheses include the "accurate" label, the language model output scores may be used to resolve the tie (with text hypotheses being ranked in descending order of output scores).

Figure 5:
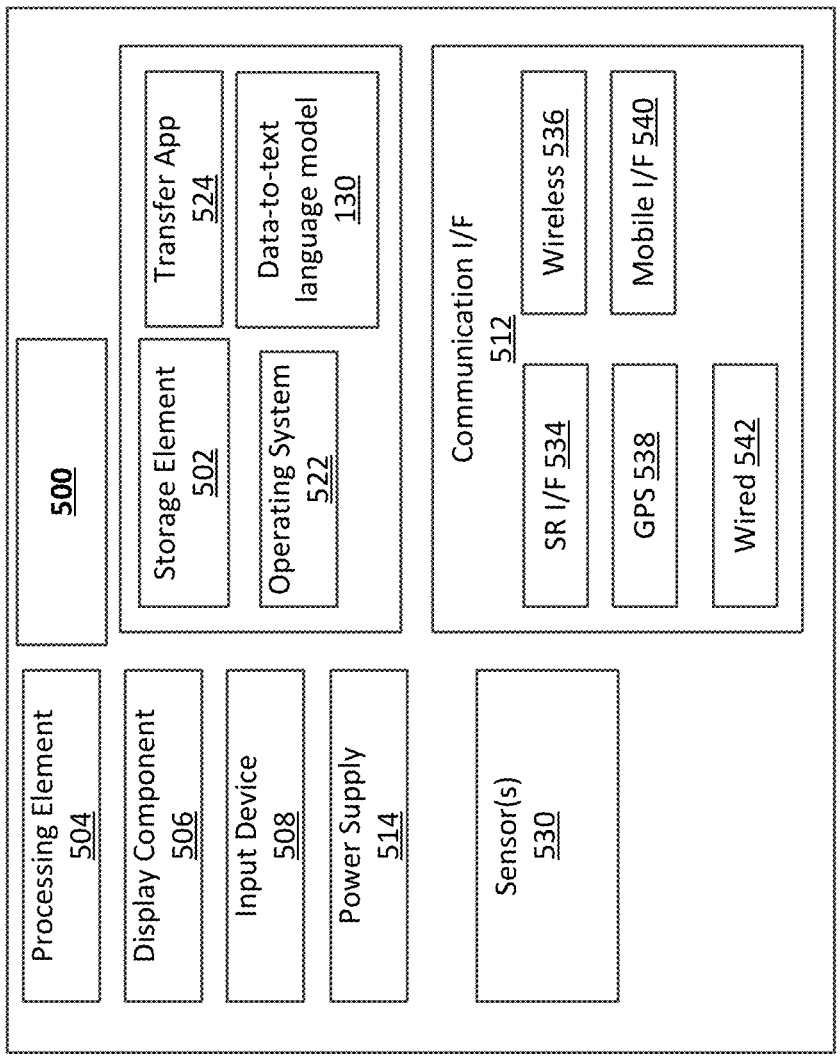
FIG. 5 is a block diagrams showing an example architecture of a computing device that may be used to perform data-to-text generation, in accordance with various embodiments described herein.

FIG. 5 is a block diagram showing an example architecture 500 of a computing device that may be used to perform data-to-text generation, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable memory devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store machine learned models, such as the data-to-text language model 130, the semantic fidelity classifier 110, and/or parameters thereof.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor and/or microphone included in the architecture 500.

When implemented in some user devices, the architecture 500 may also comprise a display component 506 and/or be configured in communication with one or more external display components 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone or an array of microphones for capturing sounds, such as voice requests. In various examples, audio captured by microphone 570 may be streamed to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. As noted above, multiple devices may be employed in a single system. In such a multi-device system, each of the devices may include different components for performing different aspects of the system's processing. The multiple devices may include overlapping components. The components of the computing device(s) 120, as described herein, are exemplary, and may be located as a stand-alone device or may be included, in whole or in part, as a component of a larger device or system.

Figure 6:
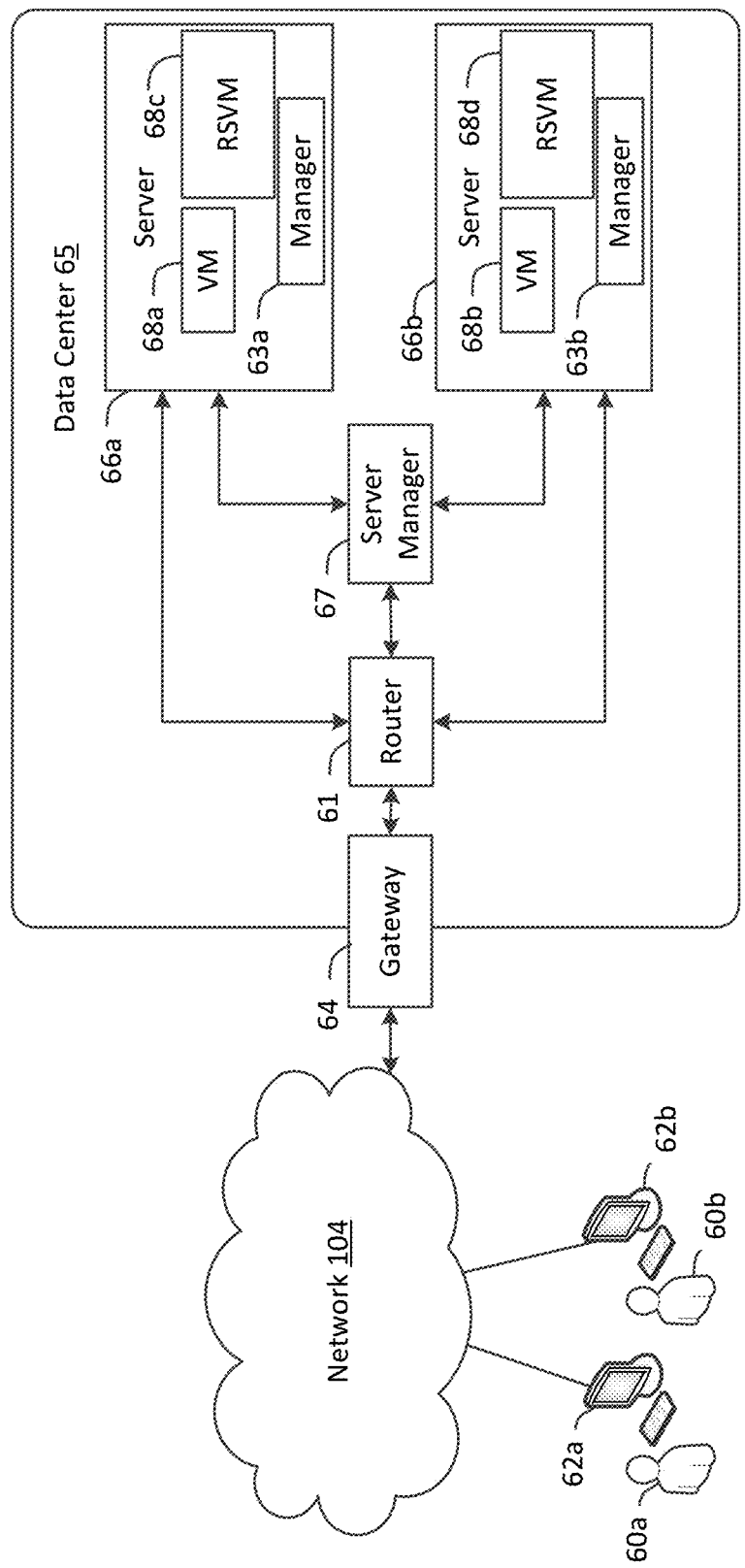
FIG. 6 is a diagram illustrating an example system for sending and providing data that may be used in accordance with the present disclosure.

An example system for sending and providing data and generation of synthetic data for computer vision object detection models will now be described in detail. In particular, FIG. 6 illustrates an example computing environment in which the embodiments described herein may be implemented. For example, the computing environment of FIG. 6 may be used to provide data-to-text generation as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60a and 60b (which may be referred herein singularly as user 60 or in the plural as users 60) via user computers 62a and 62b (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more of the various data-to-text generation techniques described herein.

These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 104. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66*a* and 66*b*. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, used to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Figure 7:
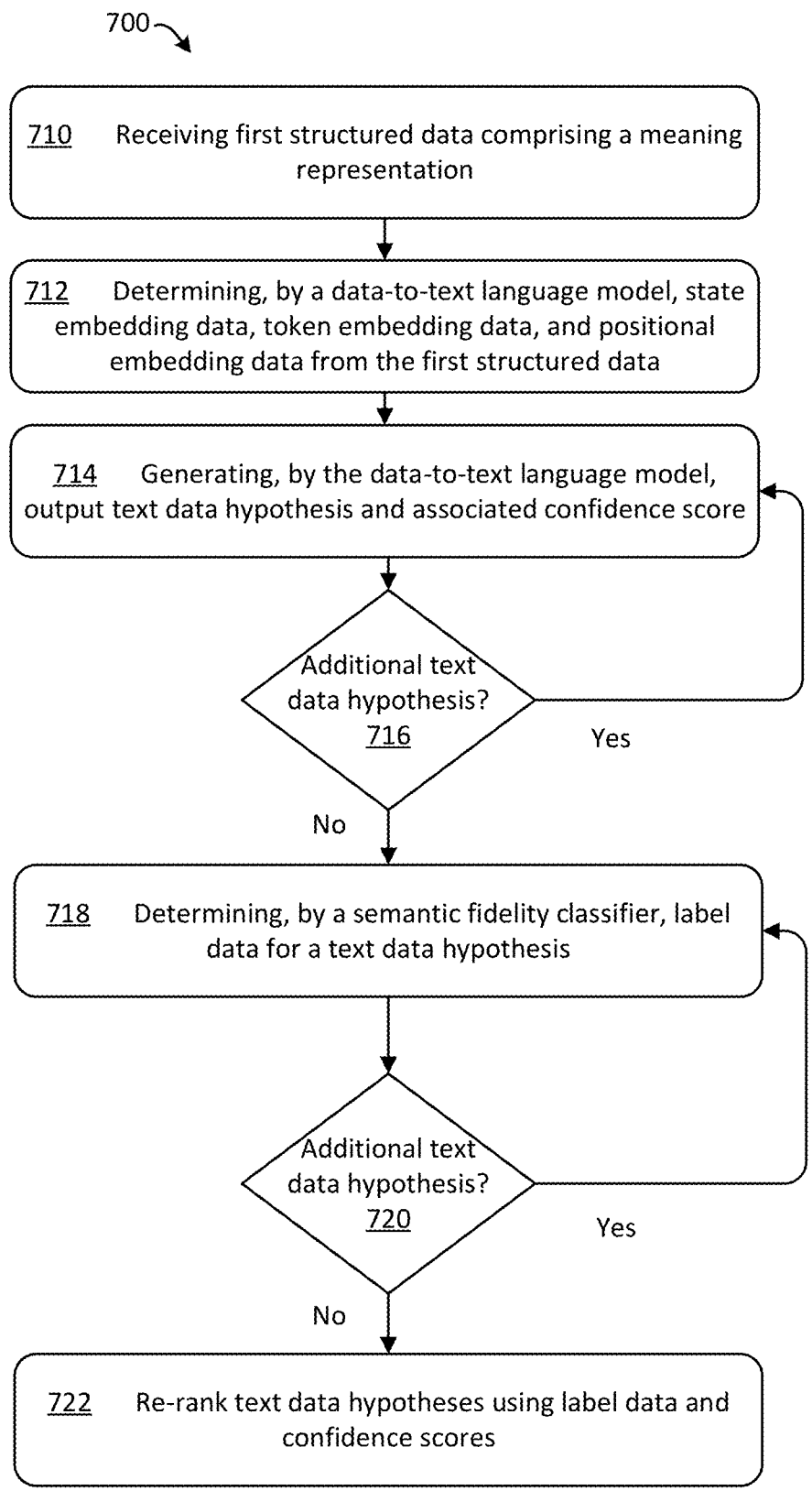
FIG. 7 depicts a flow chart showing an example process for semantically accurate data-to-text generation, in accordance with various aspects of the present disclosure.

FIG. 7 depicts a flow chart showing an example process 700 for semantically-accurate data-to-text generation, in accordance with various aspects of the present disclosure. Those portions of FIG. 7 that have been previously discussed in reference to FIGS. 1-6 may not be described again for purposes of clarity and brevity. The actions of the process 700 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 700 of FIG. 7 may begin at action 710, "Receiving first structured data representing a response to a user query" At action 710, first structured data may be received. The first structured data may comprise one or more triples and/or other meaning representation data. In various examples, the first structured data may comprise one or more identifications of nodes of a knowledge graph used to generate the first structured data.

Processing may continue from action 710 to action 712, at which a data-to-text language model (e.g., data-to-text language model 130) may determine state embedding data, including node types (e.g., special tokens identifying categories of the input data (e.g., triple categories such as "subject," "predicate," "object," etc.) and/or node value data (e.g., string data associated with one or more of the node types, as depicted in FIG. 2). Additionally, the data-to-text language model may determine token embedding data representing words and/or sub-words of the string data. Further, the data-to-text language model may determine positional embedding data representing the order of the token embeddings. The token embeddings, positional embeddings, and/or state embeddings may be learned during fine-tuning of the data-to-text language model 130 using the techniques described above. In various examples, decoder layers of the data-to-text language model may be pre-trained and may be updated for the data-to-text generation task, as described above.

Processing may continue from action 712 to action 714, at which the data-to-text language model may generate one or more text hypotheses representing the input first structured data. In various examples, a confidence score may be associated with each output text hypothesis generated by the data-to-text language model. As described above, a beam search technique may be used to generate and select the output text data hypotheses.

At action 716, a determination may be made whether there are additional text data hypotheses. For example, if the number of candidate output text data hypotheses exceeds the beam size, text data hypotheses with output confidence scores below a threshold may be dropped, and processing may proceed to action 718. Conversely, if the beam size has not yet been reached, additional text data hypotheses (and associated confidence scores) may be determined.

At action 718, the text data hypotheses and the first structured data may be sent to a semantic fidelity classifier (e.g., an encoder model used to generate label data indicating semantic accuracy/inaccuracy for a given data, text tuple). Label data may be generated for each text hypothesis output by the data-to-text language model. In various examples described herein, the label data may indicate whether the text data hypothesis is accurate, or whether the text data hypothesis includes some error, such as a hallucination, value error, omission, and/or repetition.

At action 720, a determination may be made whether or not there are additional text data hypotheses to be input into the semantic fidelity classifier 110 for the current structured data input $D_i$. If so, label data may be generated for the additional text data hypothesis at action 718. Once all the text data hypotheses have been labeled by the semantic fidelity classifier, processing may proceed to action 722, at which the text data hypotheses may be re-ranked using the label data and the output confidence scores. In various examples, all text data hypotheses with labels indicating some error (e.g., value error, hallucination, omission, and/or repetition) may be discarded. The text data hypotheses labeled as accurate may be re-ranked in descending order of output confidence scores. In various examples, the top ranked text data hypothesis result may be output as the best candidate text representation of the input structured data.

Figure 8:
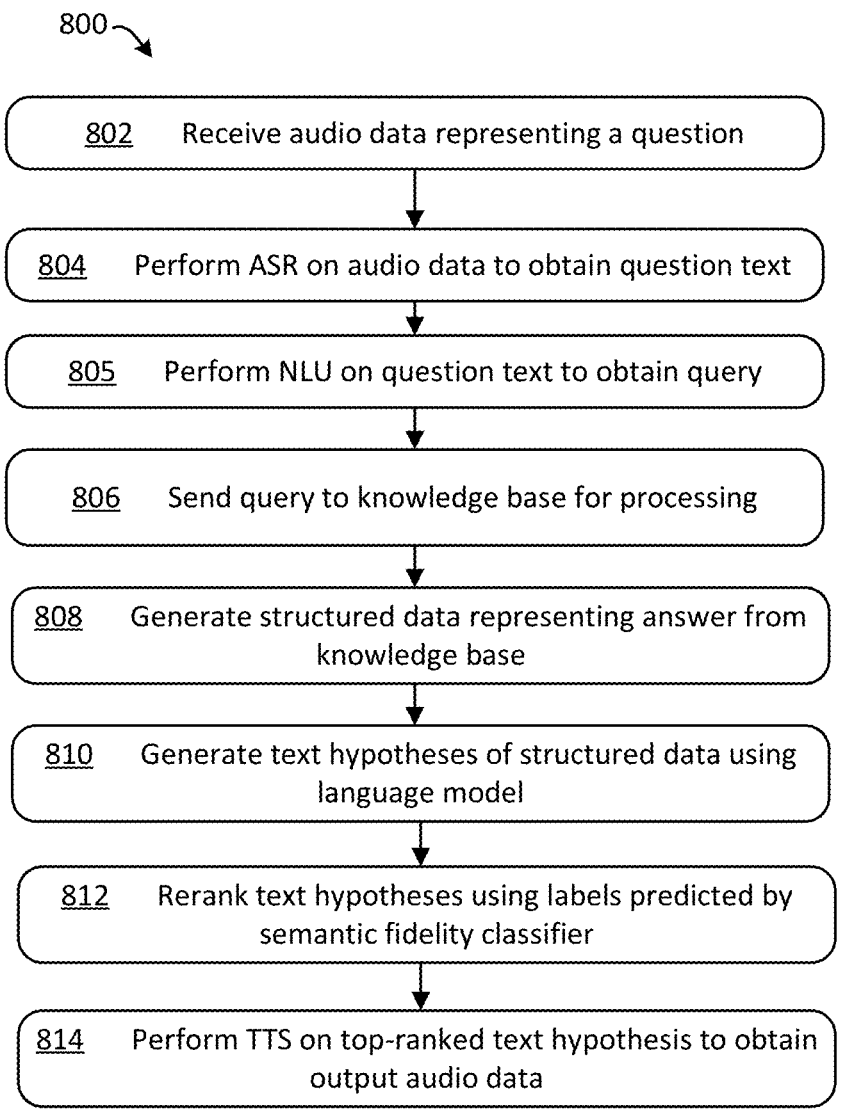
FIG. 8 depicts a flowchart showing an example process for determining a semantically accurate response to a user question by a speech processing system, in accordance with various aspects of the present disclosure.

FIG. 8 depicts a flowchart showing an example process for determining a semantically accurate response to a user question by a speech processing system, in accordance with various aspects of the present disclosure. Those portions of FIG. 8 that have been previously discussed in reference to FIGS. 1-7 may not be described again for purposes of clarity and brevity. The actions of the process 800 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 800 of FIG. 8 may begin at action 802, at which audio data may be received by a speech processing system. The audio data may represent a user question. For example, the user may verbally ask a question that may be converted into audio data by a speech processing device. Processing may continue from action 802 to action 804, at which ASR may be performed on the audio data in order to generate text data representing the audio data. Processing may continue from action 804 to action 805 at which natural language processing (NLU) may be performed on the text generated by ASR to generate query data. Processing may continue from action 805 to action 806, at which the query may be sent to a knowledge base for processing. In various examples, a query for the knowledge base may be generated using the text data. Thereafter, the knowledge base may be queried at action 808 to determine if one or more results may be obtained using the knowledge base. If so, structured data representing the answer to the question may be generated using the knowledge base. For example, one or more triples and/or other structured data representations may be generated. Processing may continue from action 808 to action 810, at which the structured data may be sent to the data-to-text language model 130. The data-to-text language model 130 may generate one or more text hypotheses of the input structured data. Processing may continue to action 812, at which the text hypotheses may be re-ranked using labels predicted by a semantic fidelity classifier, as described above. Processing may continue to action 814, at which TTS may be performed on the top-ranked text hypothesis to obtain output audio data representing the top-ranked result.

Figure 9:
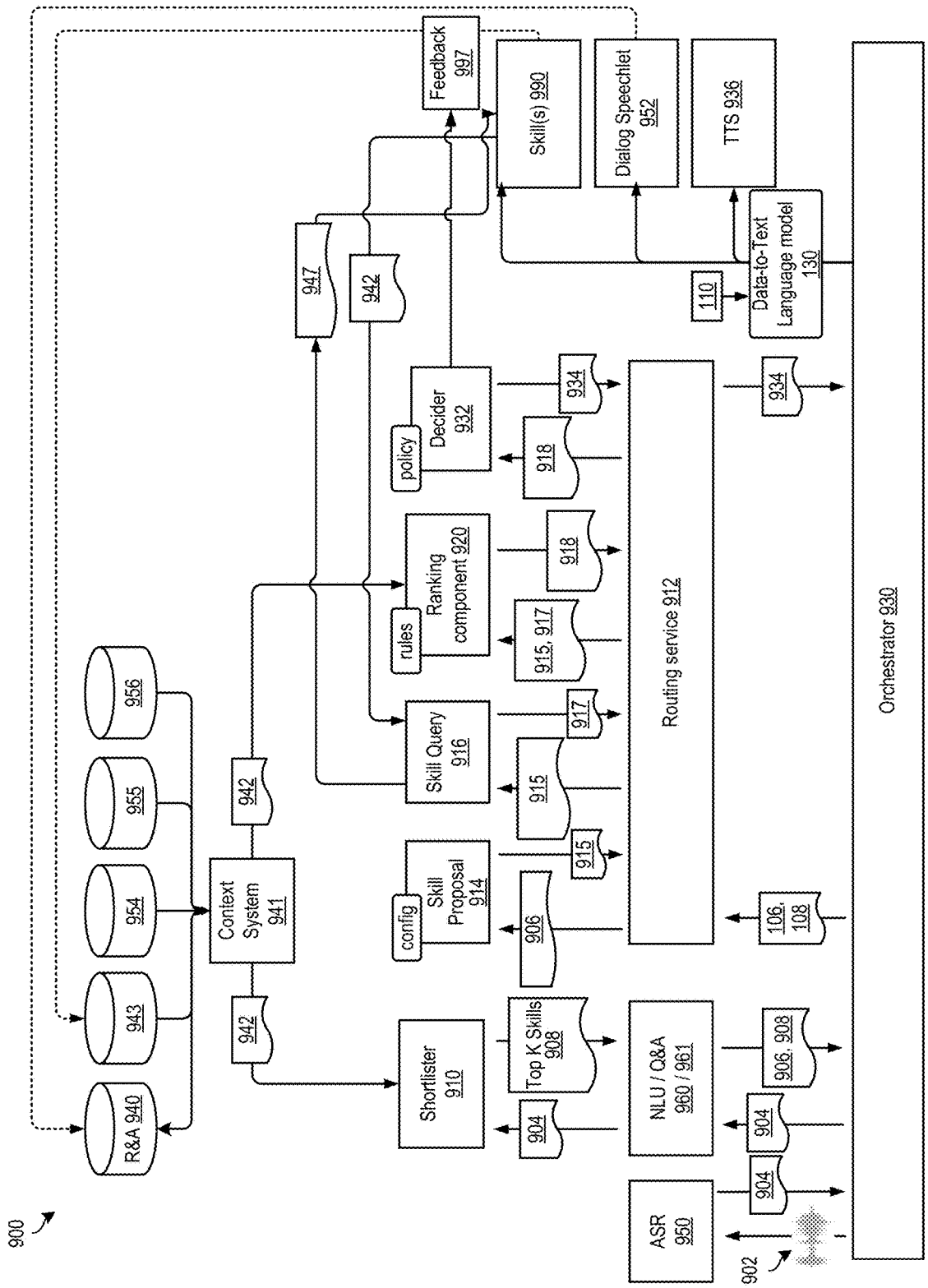
FIG. 9 is a block diagram illustrating an example speech processing system 900, according to various embodiments of the present disclosure.

FIG. 9 is a block diagram illustrating an example speech processing system 900, according to various embodiments of the present disclosure. In various examples, the speech processing system may generate structured data (e.g., a meaning representation such as the triple data described above) and may use the system 100, including the data-to-text language model 130 and/or the semantic fidelity classifier 110 to generate semantically faithful natural language text that may be output by a text to speech component (e.g., TTS component 936). For example, a question and answer component (e.g., Q&A component 961) may generate triple data representing an answer to a user's question. The system 100, including the data-to-text language model 130 and/or the semantic fidelity classifier 110 may generate semantically accurate text representing the triple data and the TTS component 936 may output the semantically accurate text.

The various components illustrated FIG. 9 may be located on the same or different physical devices. Communication between various components illustrated in FIG. 9 may occur directly or across a network. A speech processing-enabled device may capture audio using an audio capture component, such as one or more microphone(s). The speech processing enabled device may send audio data 902 (e.g., corresponding to an utterance) to an orchestrator 930 of the speech processing system 900. The speech processing enabled device may also send metadata (e.g., including device identifiers, device type data, contextual data, IP address data, room location data, etc.) to the orchestrator 930. The components depicted in FIG. 9, including components of a speech processing system may be generally referred to as spoken language processing components, a speech processing system 900 a spoken language processing system, speech processing components, and/or a speech processing routing system. Additionally, in various examples, the components depicted in FIG. 9 may process written input (e.g., text data) in addition to spoken input.

Upon receipt by the speech processing system 900, the audio data 902 may be sent to an orchestrator 930. The orchestrator 930 may include memory and logic that enables the orchestrator 930 to initiate a dialog session and to transmit various pieces and forms of data to various components of the system, as described in further detail below.

The orchestrator 930 may send the audio data 902 to an ASR component 950 (e.g., a speech recognition component). The ASR component 950 may transcribe the audio data 902 into one or more hypotheses representing speech contained in the audio data 902. The ASR component 950 interprets the speech in the audio data based on a similarity between the characteristics of the audio data corresponding to the speech and pre-established language models. For example, the ASR component 950 may compare the audio data 902 with models for sounds (e.g., subword units such as phonemes) and sequences of sounds to identify words that match the sequence of sounds in the speech represented in the audio data 902. The ASR component 950 may send text data 904 generated thereby to orchestrator 930 that may, in turn, send the text data 904 to NLU component 960 and/or question and answer component 961. As previously described, the text data 904 may include one or more ASR hypotheses. The text data 904 may include a top scoring hypothesis of the speech represented in the audio data 902 or may include an N-best list including a group of hypotheses of the speech represented in the audio data 902, and potentially respective ASR processing confidence scores. As previously described, in some other examples, the ASR component 950 (and/or other components of the speech processing system 900) may generate other metadata associated with the utterance such as an overall utterance confidence score, per-word (e.g., per token) confidence scores for the utterance, utterance duration, stream duration (e.g., duration of the stream of audio data from speech processing enabled device to speech processing system 900), a number of tokens output by ASR, etc.

The NLU component 960 attempts to make a semantic interpretation of the phrases or statements represented in the text data input therein. That is, the NLU component 960 determines one or more meanings associated with the phrases or statements represented in the text data 904 based on individual words represented in the text data 904. The NLU component 960 interprets a text string to derive an intent of the user (e.g., an action that the user desires be performed) as well as pertinent pieces of information in the text data that allow a device (e.g., the speech processing enabled device, the speech processing system 900, a computing device(s) implementing a skill, etc.) to complete the intent. For example, if the text data 904 corresponds to "Set temperature to 74 degrees," the NLU component 960 may determine the user intended to invoke a climate intent with a target temperature value slot of 74 degrees Fahrenheit. As previously described, in addition to the NLU intent and slot data, the NLU component 960 may generate other metadata associated with the utterance (e.g., with the audio data 902). Examples of such metadata include, an NLU confidence score for the top intent hypothesis, NLU classification type (e.g., statistical vs. deterministic), NLU slot presence (e.g., data indicating that a particular slot was present), NLU confidence score for the overall top hypothesis (e.g., including the relevant skill, intent, and/or slot), entity recognition confidence scores, entity recognition match types (e.g., exact match, prefix match, suffix match, etc.), etc. Herein, the data output by the NLU component 960 (depicted in FIG. 9 as "NLU 960") is referred to as NLU output data 906.

In some examples, text data 904 may be sent to a question and answer (Q&A) component 961 that may use one or more knowledge bases and/or knowledge graphs to answer a question represented in the text data 904. In at least some examples, the question and answer component 961 may determine an answer to the question in parallel with processing of the text data 904 by NLU component 960. In various examples, the question and answer component 961 may be configured to output structured data (e.g., a meaning representation) representing an answer to a question present in the text data 904. For example, the answer to a question may comprise triple data including a subject, object, and predicate, as described herein. However, in some examples, the meaning representation may be other structured data, apart from triple data, as known to those skilled in the art. In various examples, the data-to-text language model 130 (and the semantic fidelity classifier 110) may generate semantically accurate text data from the structured data output by the question and answer component 961. The text data may thereafter be output by text to speech component 936. In various examples, the decider 932 and/or the ranking component 920 may determine whether the output from the question and answer component 961 or the NLU output data 906 is more likely to address a particular user input.

NLU component 960 may send the text data 904 and/or some of NLU output data 906 (such as intents, recognized entity names, slot values, etc.) to a shortlister 910. The shortlister 910 may comprise one or more machine learning models that may be effective to predict a subset of skills that are most likely to be able to correctly process the input data, based on the input of the text data 904 and/or the NLU output data 906. In addition, the shortlister 910 may call the ranking and arbitration component 940 to request features pre-computed by the ranking and arbitration component 940 according to features used as inputs by the machine learning models of shortlister 910. As previously described, the shortlister 910 may define source data used to compute the features and/or may specify functions used to generate the features from the source data (e.g., formulae and/or functions) prior to runtime processing of input data. The ranking and arbitration component 940 may precompute the features according to the specified feature definitions supplied by shortlister 910 and by the other components of speech processing system 900 and may store the precomputed features in memory. Ranking and arbitration component 940 may generate indexes that may be used to retrieve the precomputed features during runtime (e.g., through an API). Accordingly, during runtime processing, shortlister 910 may retrieve the precomputed features from ranking and arbitration component 940 and may use the precomputed features (among other inputs) to predict a subset of skills that are most likely to be appropriate to process the current input data. In some examples, in addition to predicting a subset of skills, shortlister 910 may predict whether or not question and answer service 961 is likely to generate an appropriate response to the current input data. Accordingly, shortlister 910 may send the top K skills 908 to NLU component 960. NLU component 960 may thereafter perform skill-specific NLU processing (and/or question-and-answer processing by question and answer component 961) for the skills in the top K skills 908 to determine skill-specific intents, slots, and/or named entities. NLU output data 906 may include such skill-specific data (e.g., skill-specific N-best hypotheses).

Ranking and arbitration component 940 may communicate with various systems in order to obtain source data used to precompute features. For example, ranking and arbitration component 940 may communicate with feedback storage 943 to receive user feedback data (e.g., explicit and/or implicit user feedback related to user satisfaction with processing of input data). In various examples, the user feedback data may be user-specific and/or device specific and may indicate whether a user was satisfied or not satisfied with a particular interaction with speech processing system 900. As previously discussed, in various examples user feedback data may be predicted for input data prior to processing the input data using a skill 990. In various examples, user feedback data may be used to pre-compute various features used by machine learning models of speech processing system 900. Accordingly, in some examples, the skills selected for processing particular input data may be determined based at least in part on skills that a user (or a group of similar users) has responded positively to in the past.

Additionally, ranking and arbitration component 940 may communicate with endpoint context system 954, which may provide context data at the conclusion of a user interaction with the speech processing system 900. In another example, ranking and arbitration component 940 may communicate with skill data 956 to determine information from the skill regarding past interactions with the skill and/or data acquired by the skill. Additionally, ranking and arbitration component 940 may communicate with other data sources 955, as new services are added and/or as new data types that may be useful for routing prediction are made available. In addition to ranking and arbitration component 940 using context data 942 to precompute features used by various machine learning models of the routing architecture of the speech processing system 900, a context system 941 may receive the context data 942. The context system 941 may provide the context data directly to both ranking and arbitration component 940 as well as to various components of the routing architecture of speech processing system 900. For example, the context system 941 may send context data 942 to shortlister 910 and/or ranking component 920 in order to determine a shortlist of skills 990 for particular input data and/or in order to rank the shortlisted skills.

NLU output data 906 (which may, in some examples, include question and answer output data) and top K skills 908 may be sent by NLU component 960 to orchestrator 930. Orchestrator 930 may send the top K skills 908 and the NLU output data 906 to routing service 912. Routing service 912 may send the top K skills 908 and NLU output data 906 to skill proposal component 914. Skills 990 may subscribe to particular intents using skill proposal component 914. Accordingly, skill proposal component 914 may receive the NLU output data 906 and may determine whether any of the included intents correspond to one or more of skills 990. If so, skill proposal component 914 may generate candidate data comprising <Intent, Skill> candidate pairs 915. The candidate pairs 915 may be sent to routing service 912 and may be sent by routing service 912 to skill query service 916. Skill query service 916 comprises an API through which skills 990 may "opt out" of particular requests. For example, a skill 990 may comprise a video playback skill. Accordingly, the skill 990 may register with skill query service 916 to indicate that only requests made on a device with a display screen should be routed to the particular skill 990. In addition, skills 990 may communicate availability information, pricing information, and/or other structured descriptions of how and under what circumstances (e.g., determined using context data) the skill 990 can fulfill a request represented by the current input data. Skill query service 916 may send a signal 917 indicating what skills can fulfill a particular request (and/or what skills are unable to fulfill the request). The signal 917 may be sent to routing service 912. Routing service 912 may send the signal 917 along with the candidate pairs 915 to a ranking component 920. As depicted in FIG. 2, skills 990 may send context data 942 to skill query service 916 to indicate situations in which a skill may opt out of processing a particular request (e.g., if the device sending the input data does not include a display screen, etc.). In various examples, the context data 942 sent by skills 990 to skill query service 916 may be skill and/or request specific context data. Additionally, skill query service 916 may send intent requests 947 to skills 990.

Ranking component 920 may include one or more statistical machine learning models effective to rank the candidates included in candidate pairs 915. In order to rank the candidate pairs 915, ranking component 920 may generate confidence scores for each corresponding candidate pairs 915. A confidence score may indicate that the corresponding skill 990 and/or intent of the candidate pair is appropriate to process the request. Ranking component 920 may compute features using the candidate pairs 915 and signal 917 in order to predict the ranking of the skills 990 included in the candidate pairs 915. The features computing during processing of the input data (sometimes referred to as "runtime features") may comprise a feature representation of the list of candidate pairs 915 and/or a representation of the signal 917. Additionally, ranking component 920 may query ranking and arbitration component 940 for precomputed features that have been defined for use by ranking component 920. As previously described, the precomputed features may be determined based on contextual data, user feedback data, past usage data, skill data, previous rankings of ranking component 920, etc. Additionally, ranking component 920 may compute runtime features using context data 942, user feedback data from feedback storage 943, and/or other data sources. In various examples, the loss function for the machine learning models of ranking component 920 may optimize based on user satisfaction scores computed using user feedback data from feedback storage 943.

Ranking component 920 may generate a ranked list 918 of the candidate skills indicated in candidate pairs 915. In at least some examples, the ranking component 920 may use a deep neural network as a machine learning model for determining the ranked list 918. In some examples, ranking component 920 (and/or some other speech processing system 900 component, such as decider engine 932) may determine plan data that may override the ranked list 918 such that a lower ranked skill among the candidate pairs 915 may be selected for processing the input data. In various examples, the confidence scores for skill-specific interpretations output by reinforcement learning model 979 may be used by ranking component 920 to generate the ranked list. As such, candidate pairs that include skill-specific NLU interpretations with high confidence scores (from reinforcement learning model 979) may be more highly ranked by ranking component 920, in some examples.

In another example, the decider engine 932 may store policies that may control whether or not explicit user feedback is solicited (e.g., via TTS) after the completion of an action (e.g., by the top-ranked skill determined by the ranker component). In various examples, such feedback data may be used to train reinforcement learning model 979. In some other examples, such feedback data may be used as a feature during prediction by reinforcement learning model 979. Explicit feedback may be solicited through the dialog speechlet 952 prior to routing input data to a skill for processing. In another example, decider engine 932 may control feedback component 997 to request explicit feedback from a user post-skill processing (e.g., via TTS). In various examples, feedback component 997 may ask the user whether or not the user was satisfied with the action taken by the speech processing system 900. In yet another example, an exploration policy defining a dynamic routing adjustment may send input data that matches predicate data defined using the dynamic routing adjustment component to a newly-implemented skill 990. The decider engine 932 may determine that the top ranked result from the ranking component 920 should be ignored due to the dynamic routing adjustment being performed by the dynamic routing adjustment component. Additionally, in some examples, a policy of the decider engine 932 may be to solicit explicit feedback from the user whenever a new skill is routed to due to a dynamic routing adjustment. Accordingly, at the completion of the action, the decider engine 932 may control TTS to inquire as to whether the user was satisfied with the interaction with the new skill and/or whether the performed action was the action intended by the user. Decider engine 932 may output plan data that comprises a routing plan 934 for processing the input data. The routing plan 934 may define a target skill 990 (and/or may identify that question and answer component 961) to process the input data. As described above, the target skill 990 may be selected as the top-ranked hypothesis determined by the ranking component 920. In some other examples, the decider engine 932 may select a target skill 990 based on a policy, as described above. In some examples, the ranking component 920 may determine that two different skills are equally applicable for processing the input data. In such examples, the decider engine 932 may determine that disambiguation should occur. Accordingly, the routing plan 934 may include sending the input data to a dialog speechlet 952 that may output (via TTS) one or more questions (e.g., a disambiguation request) used to prompt the user to disambiguate between the two equally likely (or approximately equally likely) interpretations of the input data. For example, it may be unclear, based on a user's request, whether the user intended to invoke a movie playback skill or a music playback skill, as a movie and a soundtrack for the movie may be identified using the same name. Accordingly, the decider engine 932 may determine that the top two hypotheses of ranking component 920 are equally likely (or approximately equally likely) and may determine that a question should be asked to disambiguate between the two possible actions. Accordingly, the routing plan 934 may route the input data to the dialog speechlet 952, and the dialog speechlet 952 may inquire whether the user intended to play the movie or the soundtrack.

In another example, the decider engine 932 may determine that the user was not satisfied with the top hypothesis of the ranking component 920 (e.g., due to explicit or implicit feedback received from the user in response to taking an action associated with the top ranking component 920 hypothesis). Accordingly, the decider engine 932 may determine that the routing plan 934 should be to determine the second highest ranked hypothesis of the ranking component 920. The routing plan 934 may be sent to the fallback engine 936. In various examples, the fallback engine 936 may determine a list of the top hypotheses, top intents, and/or top ASR text interpretations from the previous turn of dialog, and may select a fallback option for processing the input data from the lists.

If a skill 990 outputs natural language text in response to processing, the orchestrator may send the text to TTS component 936 for output as audio representing the speech. Conversely, if the skill 990 (and/or the question and answer component 961) outputs a structured data representation (e.g., a meaning representation such as triple data) representing the response to the current input data, the data-to-text language model 130 and/or the semantic fidelity classifier 110 may be used to generate natural language output text representing the structured data. TTS component 936 may thereafter output audio representing the natural language output text.

Although various systems described herein may be embodied in software or code executed by general purpose hardware as discussed above, as an alternate the same may also be embodied in dedicated hardware or a combination of software/general purpose hardware and dedicated hardware.

If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method comprising:
receiving first audio data representing a question;
generating, by an automatic speech recognition component, first text data representing the first audio data;
receiving a first structured data representation of the first text data, the first structured data representation comprising triple data representing a response to the question, the triple data comprising first data representing a subject of the response, second data representing an object of the response, and third data representing a relationship between the subject and the object;
sending the triple data to a first machine learned model comprising a neural language model;
generating, by the first machine learned model, first output text comprising a first sentence representing the triple data;
training the first machine learned model using a training set comprising second text data and a structured data representation of the second text data;
determining, by a second machine learned model, first label data for the first output text, the first label data classifying the first sentence as a semantically accurate representation of the first structured data representation; and
generating, by a text-to-speech component, second audio data representing the first output text.

2. The method of claim 1, further comprising:
generating, by the first machine learned model, second output text comprising a second sentence representing the triple data;
determining, by the second machine learned model, second label data for the second output text, the second label data classifying the second sentence as semantically inaccurate; and
selecting the first output text from among the first output text and the second output text for output as the second audio data by the text-to-speech component.

3. The method of claim 1, further comprising:
generating, by the first machine learned model, second output text comprising a second sentence representing the triple data;
determining, by the second machine learned model, second label data for the second output text, the second label data classifying the second sentence as semantically accurate;
determining, by the first machine learned model, a first confidence score associated with the first output text;
determining, by the first machine learned model, a second confidence score associated with the second output text; and
selecting, using the first confidence score and the second confidence score, the first output text.

4. The method of claim 1, further comprising:
receiving metadata including first metadata identifying the first data as the subject, second metadata identifying the second data as the object, and third metadata identifying the third data as the relationship between the subject and the object; and
using the metadata to generate the first output text such that the first data is included in the first output text.

5. A method comprising:
receiving first data comprising a structured representation of linguistic data;
determining first metadata describing a subject of the first data;
determining second metadata describing an object of the first data;
generating, by a first model comprising a computer-implemented neural language model, first output data comprising a first natural language representation of the first data, wherein the first natural language representation comprises a sentence comprising the subject and the object, wherein the sentence is generated based at least in part on the first metadata and the second metadata;
training the first model using a training data set comprising text data and a structured data representation of the text data;
determining, by a second model, second data indicating that the first natural language representation is a semantically accurate representation of the first data; and
generating an output comprising the first output data, wherein the output is generated based at least in part on the second data.

6. The method of claim 5, further comprising:
generating, by the first model, second output data comprising a second natural language representation of the first data; and
determining, by the second model, third data indicating that the second natural language representation is a semantically inaccurate representation of the first data, wherein the generating the output comprising the first output data is further based at least in part on the third data.

7. The method of claim 5, further comprising:
receiving first training data for the second model comprising a first data-text tuple and a first label data associated with the first data-text tuple, wherein the first label data indicates that text of the first data-text tuple is an accurate semantic representation of data of the first data-text tuple;
receiving second training data for the second model comprising a second data-text tuple and a second label data associated with the second data-text tuple, wherein the second label data indicates that text of the second data-text tuple is an inaccurate semantic representation of data of the second data-text tuple; and
updating parameters of the second model based at least in part on the first training data and the second training data.

8. The method of claim 5, further comprising:
generating, by the first model, second output data comprising a second natural language representation of the first data;
generating, by the first model, a first confidence score associated with the first output data;
generating, by the first model, a second confidence score associated with the second output data; and
selecting the first output data for output further based at least in part on the first confidence score and the second confidence score.

9. The method of claim 5, further comprising:
generating, by the first model, second output data comprising a second natural language representation of the first data;
generating, by the first model, a first confidence score associated with the first output data;
generating, by the first model, a second confidence score associated with the second output data, the second confidence score being higher than the first confidence score;
determining, by the second model, third data indicating that the second natural language representation is a semantically inaccurate representation of the first data; and
selecting the first output data for output further based at least in part on the third data.

10. The method of claim 5, wherein the first data comprises triple data including the subject, a predicate, and the object, the method further comprising:
determining, by the first model, third metadata identifying the predicate of the first data; and
wherein the generating, by the first model, the first output data includes omitting the predicate from the first natural language representation based at least in part on the third metadata.

11. The method of claim 5, further comprising:
generating first training data for a first data-text tuple by duplicating at least one word in the text of the first data-text tuple; and
generating second training data for the first data-text tuple by inserting at least one word from a different data-text tuple into the text of the first data-text tuple.

12. A system, comprising:
at least one processor; and
at least one non-transitory, computer-readable memory storing instructions that, when executed by the at least one processor, are effective to program the at least one processor to:
receive first data comprising a structured representation of linguistic data;
determine first metadata describing a subject of the first data;
determine second metadata describing an object of the first data;
generate, by a first model comprising a computer-implemented neural language model, first output data comprising a first natural language representation of the first data, wherein the first natural language representation comprises a sentence comprising the subject and the object, wherein the sentence is generated based at least in part on the first metadata and the second metadata;
train the first model using a training data set comprising text data and a structured data representation of the text data;
determine, by a second model, second data indicating that the first natural language representation is a semantically accurate representation of the first data; and
generate an output comprising the first output data, wherein the output is generated based at least in part on the second data.

13. The system of claim 12, wherein the at least one non-transitory, computer-readable memory stores further instructions that, when executed by the at least one processor, are further effective to program the at least one processor to:
generate, by the first model, second output data comprising a second natural language representation of the first data; and
determine, by the second model, third data indicating that the second natural language representation is a semantically inaccurate representation of the first data, wherein the generating the output comprising the first output data is further based at least in part on the third data.

14. The system of claim 12, wherein the at least one non-transitory, computer-readable memory stores further instructions that, when executed by the at least one processor, are further effective to program the at least one processor to:
receive first training data for the second model comprising a first data-text tuple and a first label data associated with the first data-text tuple, wherein the first label data indicates that text of the first data-text tuple is an accurate semantic representation of data of the first data-text tuple;
receive second training data for the second model comprising a second data-text tuple and a second label data associated with the second data-text tuple, wherein the second label data indicates that text of the second data-text tuple is an inaccurate semantic representation of data of the second data-text tuple; and
updating parameters of the second model based at least in part on the first training data and the second training data.

15. The system of claim 12, wherein the at least one non-transitory, computer-readable memory stores further instructions that, when executed by the at least one processor, are further effective to program the at least one processor to:
generate, by the first model, second output data comprising a second natural language representation of the first data;
generate, by the first model, a first confidence score associated with the first output data;
generate, by the first model, a second confidence score associated with the second output data; and
select the first output data for output further based at least in part on the first confidence score and the second confidence score.

16. The system of claim 12, wherein the at least one non-transitory, computer-readable memory stores further instructions that, when executed by the at least one processor, are further effective to program the at least one processor to:
generate, by the first model, second output data comprising a second natural language representation of the first data;
generate, by the first model, a first confidence score associated with the first output data;
generate, by the first model, a second confidence score associated with the second output data, the second confidence score being higher than the first confidence score;
determine, by the second model, third data indicating that the second natural language representation is a semantically inaccurate representation of the first data; and
select the first output data for output further based at least in part on the third data.

17. The system of claim 12, wherein the at least one non-transitory, computer-readable memory stores further instructions that, when executed by the at least one processor, are further effective to program the at least one processor to:
determine, by the first model, third metadata identifying the predicate of the first data; and
wherein the generating, by the first model, the first output data includes omitting the predicate from the first natural language representation based at least in part on the third metadata.

18. The system of claim 12, wherein the at least one non-transitory, computer-readable memory stores further instructions that, when executed by the at least one processor, are further effective to program the at least one processor to:
generate first training data for a first data-text tuple by duplicating at least one word in the text of the first data-text tuple; and
generate second training data for the first data-text tuple by inserting at least one word from a different data-text tuple into the text of the first data-text tuple.

* * * * *